A. GERLACH.
ROTARY APPARATUS FOR TREATING LOOSE MATERIAL WITH GASEOUS FLUIDS.
APPLICATION FILED MAR. 6, 1920.

1,364,105. Patented Jan. 4, 1921.

UNITED STATES PATENT OFFICE.

ALBERT GERLACH, OF NORDHAUSEN, GERMANY.

ROTARY APPARATUS FOR TREATING LOOSE MATERIAL WITH GASEOUS FLUIDS.

1,364,105.  Specification of Letters Patent.  Patented Jan. 4, 1921.

Application filed March 6, 1920. Serial No. 363,915.

*To all whom it may concern:*

Be it known that I, ALBERT GERLACH, a citizen of Germany, residing at Nordhausen, Germany, have invented certain new and useful Improvements in Rotary Apparatus for Treating Loose Material with Gaseous Fluids; and I do hereby declare the following to be a full, clear, and exact description of the invention, such as will enable others skilled in the art to which it appertains to make and use the same.

My invention relates to improvements in rotary apparatus for treating loose material with gaseous fluids, and more particularly in apparatus in which the loose material while being subjected to the action of the gaseous fluid is made to dribble from plates or scoops provided within a rotary drum in order to stir the material and to bring the same with the whole surfaces of its particles in thorough contact with the gaseous fluid. Such apparatus are used for example for drying loose material, in which case heated air is passed through the drum. The object of the improvements is to provide an apparatus of this class in which the material is several times dribbled from one scoop to another one during each rotation of the drum, so that the material is brought in thorough contact with the gaseous fluid. With this object in view my invention consists in disposing the said scoops in sets of coöperating scoops, the scoops of the sets being arranged along polygons and in such a way that by the rotation of the drum the material is successively dribbled from one scoop of the set to the adjacent one and around the whole polygon.

In order that my invention be more clearly understood an example embodying the same has been shown in the accompanying drawing, in which the same letters of reference have been used in all the views to indicate corresponding parts.

In said drawing.

Figure 1:
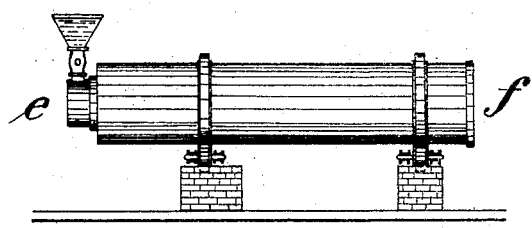
Figure 1, is a side view of the apparatus.
Figure 2:
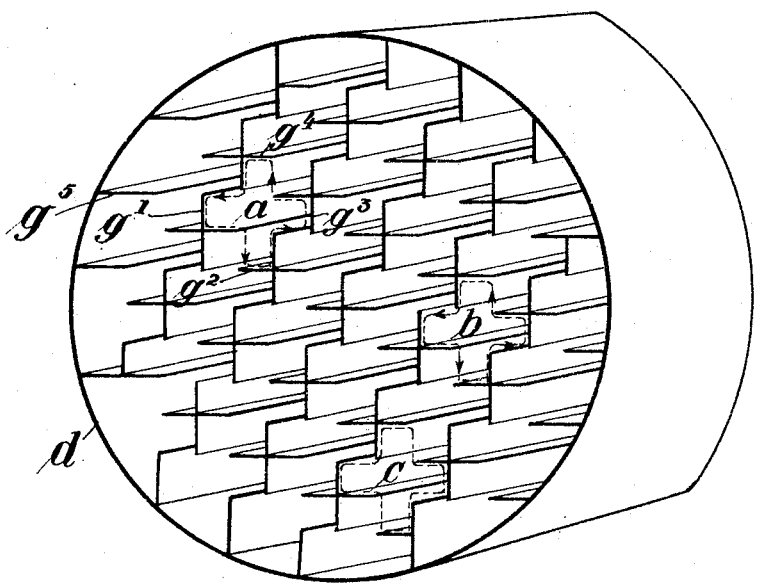
Fig. 2, is a cross-section thereof.

In the example shown in the drawing my improved apparatus comprises a rotary drum $d$ having a supply $e$ and a discharge $f$ for a gaseous fluid such as heated air. Internally the drum is provided with scoops $g$ which are disposed in sets for dribbling the loose material and moving the same by the rotation of the drum along a polygonal path. In the example shown in the figures four scoops $g^1$, $g^2$, $g^3$, $g^4$ are combined into a set, and in each set the scoops are disposed in such a way, that the loose material dribbles for example from the scoop $g^1$ to the scoop $g^2$, and after a partial rotation of the drum from the scoop $g^2$ to the scoop $g^3$, thereafter from the scoop $g^3$ to the scoop $g^4$, and from the scoop $g^4$ to the scoop $g^1$, so that the material is dribbled four times during each rotation of the drum, thereby insuring a thorough contact with the air.

In the example shown in the figures the scoops are constructed of plates disposed at right angles to each other, and adjacent scoops of adjacent sets are combined, the combined scoops having a section in the form of a cross or similar form. The paths of the loose material are likewise in the form of crosses, as is shown at $a$, $b$, and $c$. At the cylindrical wall of the drum plates $g^5$ are provided which coöperate with adjoining scoops to dribble the material several times during each revolution, though the material is not dribbled as often as four times.

While in describing the invention reference has been made to a particular embodiment thereof, I wish it to be understood, that my invention is not limited to the construction shown in the figures, and that various changes may be made within the gist of my invention. For example my invention is not limited to a construction in which the plates are composed of plane plates, and in which the number of the scoops of each set is four. In some cases I prefer to construct the scoops with sloping discharge edges in order that the material may more easily be dribbled from one scoop to the adjacent one.

It will be particularly observed that except the marginal or shell ribs, the long flat plates are so arranged that each one virtually intersects another to thereby form ribs substantially cross-shaped in cross-section, each of these ribs forming four trough-like scoops. These combined groups of troughs are so arranged with respect to each other that they form a multiplicity of sets of troughs arranged virtually in a circle, each trough having a receiving-side and a delivery-side or lip, so that as the drum rotates the loose materials will fall off the delivery-edge of one trough into the receiving-side of the next adjacent trough, and when that discharge is completed the delivery of the loose material off the delivery-edge of that trough begins, and this successive delivery of the separate mass of loose material from one trough to the next adjacent trough continues during the rotation of the drum, the dried material being delivered at one end of the drum as usual. That is to say, when the drum is charged with loose material, each annular set receives its full charge of loose material and retains that charge separate from the other loose material in the drum until it is discharged. To promote uniformity of drying action, the distance between each delivery-edge of a trough and the adjacent receiving-edge of the adjacent trough is practically uniform throughout the multiplicity of sets.

I claim:

1. An apparatus for treating loose material, comprising a rotary drum having scoops for dribbling the material arranged in sets and disposed in each set in such a way that upon rotation of the drum the material is successively and repeatedly transmitted from one scoop of each set to the adjacent one until discharged.

2. An apparatus for treating loose material, comprising a rotary drum having scoops for dribbling the material arranged in sets and disposed in each set in such a way that upon rotation of the drum the material is successively transmitted from one scoop of each set to the adjacent one, adjacent scoops of adjacent sets being combined substantially into the forms of crosses.

3. An apparatus for treating loose material, comprising a rotary drum having scoops in the form of angular plates for dribbling the material arranged in sets and disposed in each set in such a way that upon rotation of the drum the material is successively transmitted from one scoop of each set to the adjacent one, adjacent scoops of adjacent sets being combined substantially into the forms of crosses.

4. In a drying apparatus of the type set forth, a rotary drum containing a multiplicity of trough-like scoops extending longitudinally through it, these scoops being arranged virtually in annular sets, each set having a plurality of scoops, the scoops of each set being arranged to deliver from one to the other during the rotation of the drum, the distances between the delivery-edges of the troughs and the receiving-edges of the next adjacent troughs being uniform.

In testimony whereof I hereunto affix my signature in the presence of two witnesses.

ALBERT GERLACH.

Witnesses:
 PAUL GOSSEL,
 FRIEDRICH HERTZER.